US012437625B2

United States Patent
Aharonson et al.

(10) Patent No.: US 12,437,625 B2
(45) Date of Patent: Oct. 7, 2025

(54) SYSTEM AND METHOD FOR MONITORING HUMAN ACTIVITY

(71) Applicant: MOR RESEARCH APPLICATIONS LTD., Ramat Gan (IL)

(72) Inventors: Eran Aharonson, Ramat Gan (IL); Tal Tzvi Weinberg, Ramat Gan (IL); Gil Zalsman, Ramat Gan (IL)

(73) Assignee: MOR RESEARCH APPLICATIONS LTD, Ramat Gan (IL)

( * ) Notice: Subject to any disclaimer, the term of this patent is extended or adjusted under 35 U.S.C. 154(b) by 0 days.

(21) Appl. No.: 18/039,359

(22) PCT Filed: Nov. 29, 2021

(86) PCT No.: PCT/IB2021/061045
§ 371 (c)(1),
(2) Date: May 30, 2023

(87) PCT Pub. No.: WO2022/113030
PCT Pub. Date: Jun. 2, 2022

(65) Prior Publication Data
US 2024/0005767 A1    Jan. 4, 2024

(30) Foreign Application Priority Data
Nov. 30, 2020 (IL) .......................... 279092

(51) Int. Cl.
*G08B 21/02* (2006.01)
*A61B 5/00* (2006.01)
(Continued)

(52) U.S. Cl.
CPC ........ *G08B 21/0469* (2013.01); *A61B 5/1118* (2013.01); *A61B 5/4561* (2013.01)

(58) Field of Classification Search
USPC ...... 340/573.1, 539.22, 539.23, 539.31, 552, 340/568.1, 568.8, 573.3, 588, 680
See application file for complete search history.

(56) References Cited

U.S. PATENT DOCUMENTS 6,211,787 B1 *  4/2001  Yoshiike ................. G01S 17/04
                                                            600/595
6,543,735 B1 *  4/2003  Haynes .................. G08B 17/10
                                                            248/300
(Continued)

FOREIGN PATENT DOCUMENTS

CN    110458015 A    11/2019
JP    2019129930 A    8/2019
(Continued)

OTHER PUBLICATIONS

PCT International Search Report and Written Opinion for International Application No. PCT/IB2021/061045 mailed Mar. 2, 2022, 10 pages.
(Continued)

*Primary Examiner* — Daniel Previl
(74) *Attorney, Agent, or Firm* — The Roy Gross Law Firm, LLC; Roy Gross

(57) ABSTRACT

Embodiments pertain to a non-wearable monitoring system for monitoring activity of a human in a scene including a floor. The system may comprise a plurality of remote ranging emitters which are configured to emit ranging energy towards the scene. At least one first and at least one second emitter of the plurality of emitters are arranged to cover different height sections of the scene. The plurality of remote ranging emitters is arranged to obtain, based on the emitted ranging energy, reflections. The system further comprises a plurality of sensors which are configured to receive the reflections and to convert the reflections into electronic signals to generate reflection-based data. The system is
(Continued)

configured to determine based on the reflection-based data, a posture and/or activity of the human in the scene.

20 Claims, 5 Drawing Sheets

(51) Int. Cl.
*A61B 5/11* (2006.01)
*G08B 21/04* (2006.01)

(56) References Cited

U.S. PATENT DOCUMENTS

| | | | |
|---|---|---|---|
| 9,712,738 B2* | 7/2017 | Van Heugten | H04N 23/959 |
| 2004/0060950 A1* | 4/2004 | Goff | A47G 25/90 |
| | | | 223/112 |
| 2006/0234697 A1* | 10/2006 | Fernandez | H04B 17/23 |
| | | | 455/425 |
| 2012/0116252 A1* | 5/2012 | Newman | A61B 5/1117 |
| | | | 600/587 |
| 2015/0077245 A1* | 3/2015 | Kaufman | A61B 5/14551 |
| | | | 340/539.12 |
| 2016/0175091 A1* | 6/2016 | Van Heugten | A61F 2/14 |
| | | | 623/6.22 |
| 2020/0300997 A1* | 9/2020 | Gauerhof | G01S 13/56 |

FOREIGN PATENT DOCUMENTS

| | | |
|---|---|---|
| WO | 2013014578 A1 | 1/2013 |
| WO | 2016193972 A2 | 12/2016 |

OTHER PUBLICATIONS

Israel Office Action for Patent Application No. 279092 dated Feb. 24, 2021, 7 pages.
Israel Office Action for Patent Application No. 279092 dated Nov. 18, 2021, 8 pages.

* cited by examiner

SYSTEM AND METHOD FOR MONITORING HUMAN ACTIVITY

CLAIM OF PRIORITY

This application is a National Phase of PCT Patent Application No. PCT/IB2021/061045 having International filing date of Nov. 29, 2021, which claims priority to Israel Patent Application 279092, filed on Nov. 30, 2020, which are all incorporated by reference herein in their entirety.

BACKGROUND

Elderly people may require round-the-clock monitoring as they are considered to be at increased risk of suffering from fall-related injuries such as fractured bones and concussions. Additional risk groups that may require round-the-clock monitoring include prisoners and patients suffering from psychiatric disorders. Both prisoners and patients with psychiatric disorders may be at heightened risk of attempting to inflict self-injury or even commit suicide.

Round-the-clock monitoring of these risk groups would thus allow immediate intervention by a caregiver, prison guard, or the like, and, therefore, mitigate the consequences or even prevent the occurrence of undesired events.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

DETAILED DESCRIPTION

Figure 1:
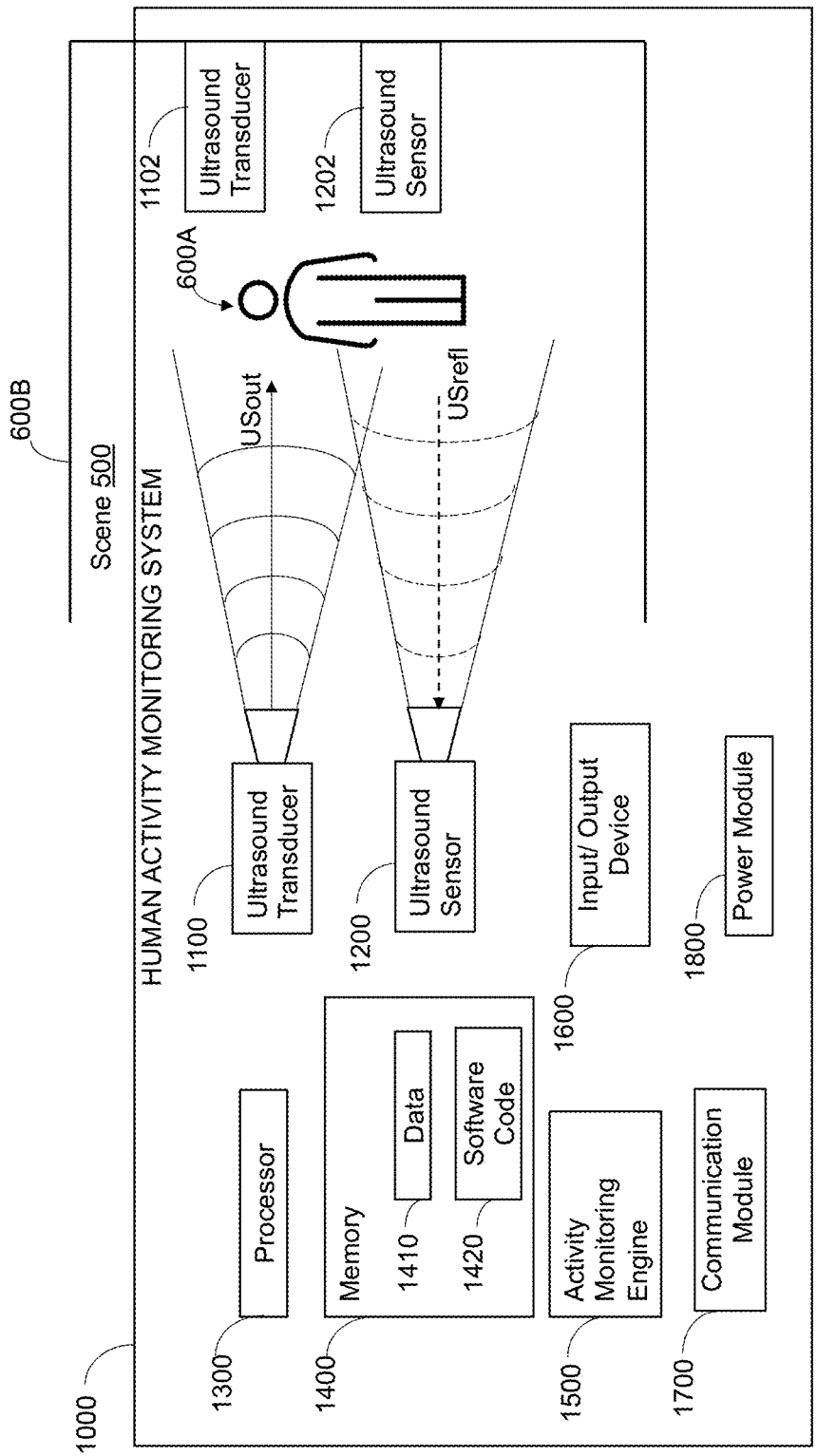
FIG. 1 is a schematic illustration of human activity monitoring system, according to some embodiments.

The following description discloses non-limiting examples of object-of-interest (OOI) activity monitoring systems and methods. The OOI can be a person.

Monitoring the activity of persons, such as elderly people and children, which are at increased risk of injury when unattended by a caregiver, poses various challenges.

The use of cameras may be limited due to privacy considerations, and the practicality of using wearable devices for monitoring purposes may be limited as they may obstruct its wearers, fall off, provide too many false-positive or false-negative alarms due to incorrect use, or the like. Radar-based solutions are expensive and may raise concerns in terms of exposure to radiation.

The system and methods disclosed herein are configured to monitor human activity in a non-obstructive and non-intrusive manner, thereby overcoming at least some of the shortcomings of known monitoring approaches.

In some examples, the expression "non-obstructive" refers to monitoring human activity without obstructing the monitored person's ability to move and/or without requiring wearable devices to be worn by the patient being monitored. Accordingly, the system can be defined as a non-wearable human activity monitoring system allowing the implementation of corresponding monitoring methods. In addition, non-obstructive can also mean that installation of the system does not noticeably further limit or confine a person's living space.

In some examples, the expression "non-intrusive" refers to the monitoring of a human activity in a manner such that if the system was to generate image information of a person's activity sensed by a plurality of sensors employed by the system, a viewer of the generated reflection data (e.g., image information) and/or a computing platform would not be capable to identify and/or authenticate the person being monitored. For example, the system is configured such that no automated or semi-automated facial recognition and/or other biometric identification and/or authentication can be employed in a useful manner on the subject being monitored. In some embodiments, the monitoring system may be configured to determine a subject's posture without providing information about the subject's body contour.

For example, the system is configured such that generated image information would be at a comparatively low resolution so that a viewer of the image information would not be capable of identifying the person yet nevertheless recognize the person's activity. In some examples, the system is configured such that monitoring data does not exceed a low-resolution threshold to ensure that the monitoring activity system or any other system for that matter is not capable of performing automated identification of the person being monitored through processing of the data. For example, the monitoring meets a low-resolution criterion to ensure that biometric identification such as behavioral-based identification or face-recognition may not be possible.

However, although the monitoring system is configured to prevent identification or to make it impossible to identify subjects being monitored (e.g., by meeting the low resolution criterion requirement), the monitoring system is configured to automatically identify which of a person's activities are related to an undesired event. In some examples, the human activity monitoring system is configured to identify human activities related to undesired events only. Accordingly, the monitoring system is configured to allow detection of undesired human activity, and output an alert indicative of the detection of undesired human activity such a attempts to inflict self-injury; attempts to commit suicide; attempts to inflict injuries to others (e.g., beating, etc.); vomiting and/or the like, while, at the same time, the monitoring data meets for example a low-resolution criterion by, for example, not exceeding a low-resolution threshold, to prevent or inhibit subject identification. In some examples, a filter may be employed to lower the resolution image data prior to analyzing the image data with respect to undesired activities.

A human activity is identified as "undesired" if an undesired activity criterion is met. Such undesired activity criterion may be met if the criterion matches a certain human posture or a series of continuous human postures that may be characterized (e.g., classified) as pertaining to an undesired activity.

The plurality of emitters and sensors are arranged relative to a scene being monitored such that a subject, located in the scene, can be subjected to ranging energy from a plurality of different positions and/or directions to receive, correspondingly, reflections from the subject from different directions for generating analyzable reflection data (also: image data or sensor ranging data) descriptive of reflections received from different directions. The scene may be a confined space such as a shower cabinet, a bathroom, a toilet, and/or the like.

In some embodiments, embodiments sensor ranging data that is generated based on reflections received at a plurality of sensors may be fused to create fused sensor ranging data for determining, based on the fused sensor ranging data, whether a person is attempting to or presently performs an undesired action.

For example, at least two of the plurality of emitters may be arranged relative to the scene such that the subject is (e.g., always) located between at least one first emitter and at least one second emitter. In such scenario, the at least one first emitter may emit ranging energy in a main direction which is substantially opposite the direction of emission of ranging energy emitted by the at least one second emitter, and corresponding sensors may be positioned to receive corresponding reflections from the subject located in the scene. For example, a same subject located in the scene may be concurrently subjected to ranging energy from the front and from behind, from the top and from the bottom, or from the left and from the right. In some further examples, at least two of the plurality of emitters may be arranged such to a first main emission axis of at least one first emitter is non-parallel to a second main emission axis of at least one second emitter. Hence, the same subject located in the scene may be concurrently subjected from multiple different directions to ranging energy, to generate corresponding reflections from the subject. Subjecting (e.g., concurrently) the same subject from different directions generates ranging sensor data that may allow 3D-mapping of the subject.

As noted above, the sensor ranging data may be generated responsive to subjecting the subject to ranging energy from at least one same direction and/or from different directions or vantage points, to cover a plurality of different fields-of-view (FOVs) of scene. In some examples, at least two of the different FOVs may be overlapping. In some examples, at least two FOVs may be non-overlapping. In some examples, the FOV covered by an emitter and/or sensor may range from 20-60 degrees.

In some embodiments, considering a scenario where a subject is standing in upright position, the subject may be subjected to ranging energy emitted along a vertical axis, along a sagittal axis and/or along a frontal axis, to receive corresponding reflections for generating respective ranging sensor data.

In some examples, the emitters and sensors may be arranged such that, regardless of the subject's instant posture and/or position in the scene, sensor ranging data descriptive of the subject's full body can be generated. Sensor ranging data that is descriptive of the subject's full body may be acquired from different perspectives, directions or vantage points.

In some embodiments, ranging data descriptive of the subject's partial or full (also: whole) body may comprise different sets of sensor ranging data that are descriptive of correspondingly different portions (e.g., height sections and/or angles) of the subject's body. Coverage of the various sets of ranging data may vary, depending on the subject's instant position, posture and/or orientation relative to the emitters and sensors, in the scene. It is noted that the term "whole body" encompasses the meaning of the term "substantially whole body".

For example, when a person is standing in the corner of a room, a first sensor ranging dataset may be descriptive of the person's whole body, and a second sensor ranging dataset may only be descriptive of the person's torso.

In another example, when a person is standing in the middle of a room, a first sensor ranging dataset may be descriptive of the person's feet, a second sensor ranging dataset may be descriptive of the person's torso, and a third sensor ranging dataset may be descriptive of the person's head. It is noted that different sensor ranging datasets may pertain to different imaging angles.

In some examples, the plurality of ranging emitters and sensors may be arranged with respect to a scene (e.g., a bathroom or shower cabinet) such that there is (substantially) no dead angle (also: dead sector, or blind spot).

For example, the plurality of ranging emitters and reflection sensors may be arranged such that there is no space in a room that is not being monitored.

Thus, the monitoring system is configured such that the subject's posture and/or activity is always monitorable and determinable, from one or more directions, by the plurality of emitters and sensors, e.g., for determining attempts of suicide through hanging. In other words, during system operation, attempts of committing suicide through hanging do not remain undetected.

In some scenarios, the person, who may or may not be aware that he is being non-intrusively monitored, may intentionally or inadvertently block the entire field-of-view of a first emitter and/or sensor. However, the plurality of emitters and sensors may be arranged such that whenever the person blocks with his body the field-of-view of one or more of the plurality of emitters and/or sensors, at least one other sensor and emitter can, at the same time, generate sensor ranging data relating to the same subject from another angle, to allow determining, for example, whether the person is trying to commit suicide through hanging (e.g., by detecting whether both the person's feet are above ground and/or perform any other undesired action) and/or whether the person is trying to perform any other undesired action.

In some embodiments, the plurality of emitters and sensors are arranged such that a person's instant posture, position and/or orientation in a room, in which both his or her feet are above ground, is always noninvasively detectable, irrespective of the person's posture, position and/or orientation in the room relative to the room's side walls, e.g., irrespective of where the person is located within the room (e.g., center, room edge, corner).

In some embodiments, the human activity monitoring system may comprise a plurality of remote ranging devices (e.g., ultrasound, LIDAR, active infrared imaging, etc.) comprising energy emitters and corresponding sensors. In some embodiments, the ranging techniques employed specifically exclude RADAR-based techniques and/or any other techniques that may enable imaging of a scene through solid and opaque wall structures including, for example, brick walls, wooden walls, walls made of masonry, concrete, and/or the like. The remote ranging devices and/or sensors may be waterproof such that they can be subjected, during operation, to water. Accordingly, in some scenarios, the remote ranging devices can be used in a shower, and/or in any other environment in which the emitters may be continuously or occasionally subjected to water (e.g., flowing water, splashes, droplets).

In some embodiments, the remote ranging devices described herein may require direct or indirect (yet unobstructed or multipath-enabled) line-of-sight (LOS) with respect to, for example, ultrasound, LIDAR, active infrared imaging, or the like, for determining a distance between the emitter and the object.

The expression "indirect LOS" pertains to scenarios where there is no direct LOS between the ranging device and the object, but where a distance can nevertheless be determined using ranging techniques in which multipath reflections are taken into considerations (e.g., through simulations, suitably arranged reflective and/or path folding elements and sensors arranged to receive folded ranging energy).

In some embodiments, the system described herein may be referred to as an active ranging system, since the system actively emits energy (e.g., acoustic energy, laser light) towards a scene to responsively generate and sense reflections from the scene.

In some examples, the plurality of emitters and sensors may herein be referred to "ranging elements".

The plurality of emitters are configured to emit energy in the form of acoustic and/or electromagnetic waves (e.g., light such as infrared light of laser light) towards a scene to generate corresponding reflections from a human located in the scene.

The plurality of sensors are configured to receive the reflections and to convert the reflections into processable electronic signals. The electronic signals may be processed to obtain reflection-based distance measurements to obtain data (also: sensor ranging data) descriptive of a present posture or of a plurality of sequential postures of the human. Based on the generated data descriptive of the at least one posture, the system determines whether the human subject is performing an activity that is or could lead to an undesired event. In some embodiments, the system is configured to predict the onset of an undesired event.

Ultrasound-based sensing and monitoring of human activity ensures that the person being monitored is not exposed to potentially hazardous electromagnetic (EM) radiation due to the monitoring activity. As already noted above, remote ranging-based based human activity monitoring may require direct line-of-sight (LOS) between the emitter and the monitored person and further between the receiving sensors and the monitored object. However, these the emitters and sensors may be small enough so that they may be easily concealed from the person being monitored. For example, the elements may be partially or fully enclosed by ornamental wall designs and/or wall structures and/or other objects such as bathtubs, toilet, closet, bed, table, door, etc. In some embodiments, emitters and sensors may be visible (yet optionally concealed from the person) in the scene as direct LOS is required between the object and the ultrasound transducers/sensors.

Although the description below pertains to ultrasound-based remote ranging and activity monitoring, this should by no means be construed in a limiting manner. Accordingly, additional or alternative technologies may be employed including, for example, LIDAR, laser, etc. Reference is now made to FIG. 1. Human activity monitoring system 1000 may include an ultrasound transducer 1100 configured to emit ultrasonic energy USout towards scene 500, and an ultrasound sensor 1200 configured to sense, based on the emitted ultrasonic energy USout, ultrasonic energy reflections USrefl which are received from monitored scene 500. Accordingly, ultrasound sensor 1200 may be located relative to ultrasound transducer 1100 such to sense ultrasonic wave reflections obtained in response to outputting ultrasonic waves towards scene 500.

Ultrasound transducer 1100 may comprise one or more ultrasound transducers. Ultrasound sensor 1200 may comprise one or more ultrasound sensors. Ultrasound sensor 1200 is arranged and configured to convert the ultrasound reflections USrefl into electronic signals to generate reflection-based ultrasound data. The reflection-based ultrasound data may be descriptive of a distance between one or more objects 600 in scene 500 and ultrasound transducer 1100 and/or sensor 1200. Object 600 in scene may pertain to a human 600A located in scene 500 and/or to walls 600B and/or other objects located in scene 500 to be monitored.

The distance may be calculated, for example, as follows:

$$\text{Distance (cm)} = \text{speed of sound} \left(\frac{cm}{\mu s}\right) \times \text{Time} (\mu s)/2 \qquad \text{Equation 1}$$

Additional or alternative methods may be employed for determining a distance between an object in the scene and the one or more remote ranging devices.

In some examples, one or more first ultrasonic sensors 1200 may be arranged in the vicinity of one or more first ultrasound transducer 1100 to form a set of ultrasonic transducers-sensor for emitting ultrasound energy USout towards a portion of scene 500 and for sensing ultrasonic wave reflections USrefl from the same scene portion. In some examples, for each set, the number of first ultrasound transducers 1100 may be equal to the number of first ultrasound sensors 1200. A plurality of ultrasound transducer-sensor sets may be employed for generating reflection-based ultrasound data relating to one or more of scene portions. At least some of the plurality of ultrasound transducer-sensor sets may be arranged such that the scene portions covered thereby are non-overlapping, partially overlapping or fully overlapping. For example, two adjacent sets of ultrasound transducer-sensors may cover two different yet partially overlapping scene portions. In a further example, two adjacent sets of ultrasound transducer-sensors may cover two different yet fully overlapping scene portions, i.e., a first scene portion may be comprised in a second scene portion. In some embodiments, two different scene portions covered by two adjacent ultrasound transducer-sensors sets may be non-overlapping.

In some embodiments, the plurality of ultrasound transducer-sensor sets may be arranged to monitor a region-of-interest (ROI) of scene 500. An ROI may be selected to cover, for example, a shower armature, a lavatory seat, and/or the like, as will be outlined in more detail further below.

In some embodiments, human activity monitoring system 1000 may include (second) receiving sensors 1202. In some embodiments, system 1000 may include additional (also: second) ultrasound transducers 1102 arranged to output ultrasonic energy towards scene 500 from a different direction than ultrasound transducers 1100. For example, receiving sensors 1202 may be positioned to receive ultrasonic energy that is output by ultrasound transducers 1100, in the event of direct LOS between first ultrasound transducers 1100 and second ultrasound sensors 1202. In some examples, receiving sensors 1202 may be arranged in alignment (e.g., opposite) first ultrasound transducers 1100. In some embodiments, a corresponding second ultrasound sensor 1202 may be positioned in alignment with a corresponding first ultrasound transducer 1100.

In some embodiments, second ultrasound sensors 1202 may be employed to detect false negatives. For example, when first ultrasound transducer 1100 outputs ultrasonic energy towards scene 500 and neither first ultrasound sensor 1200 nor second ultrasound sensor 1202 detect ultrasonic energy, then a possible "false negative" by first ultrasound sensor 1200 may be detected. In that case, it may be determined that first ultrasound transducer 1100 is malfunctioning.

In some embodiments, a gated technique may be employed to sense US reflections from a selected depth-of-field.

In some embodiments, the system is configured to obtain and process data relating to sensed physical stimuli pertaining to a person's monitored activity to selectively display to the user of monitoring system 1000 information related to undesired events. For that purpose, human activity monitoring system 1000 may include a processor 1300 and a memory 1400 which is configured to store data 1410 and software code 1420. Processor 1300 may be configured to execute software code 1420 for the processing of data 1410. The processing of data 1410 may result in the implementation of an activity monitoring engine 1500. The reflection reflection-based ultrasound data may be processed to determine, over time, one or more instantaneous distances between object 600 and ultrasound transducer 1100 and/or sensor 1200.

Activity monitoring engine 1500 may be configured to analyze the one or more instantaneous distances for detecting an undesired event in relation to activities of human object 600A in scene 500.

The term "processor", as used herein, may additionally or alternatively refer to a controller. Processor 1300 may be implemented by various types of processor devices and/or processor architectures including, for example, embedded processors, communication processors, graphics processing unit (GPU)-accelerated computing, soft-core processors and/or general purpose processors.

Memory 1400 may be implemented by various types of memories, including transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 1400 may, for example, include, e.g., temporally-based and/or non-temporally based instructions. As long-term memory, memory 1400 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

Human activity monitoring system 1000 may further include an input/output device 1600 which may be configured to provide or receive any type of data or information. Input/output device 1600 may include, for example, visual presentation devices or systems such as, for example, computer screen(s), head mounted display (HMD) device(s), first person view (FPV) display device(s), device interfaces (e.g., an Universal Serial Bus interface, touch screens), haptic output device (e.g., vibrational feedback), a and/or audio output device(s) such as, for example, speaker(s), and/or earphones. Input/output device 1600 may be employed to access information generated by the system and/or to provide inputs including, for instance, control commands, operating parameters, queries and/or the like. For example, input/output device 1600 may allow a user of human activity monitoring system 1000 to perform one or more of the following: defining an ROI, ultrasound transducer configuration and/or control, sensor configuration and/or control, configuring system for automatic or semi-automatic human activity tracking, and/or the like.

Monitoring system 1000 may further comprise at least one communication module 1700 configured to enable wired and/or wireless communication between the various components and/or modules of the system and which may communicate with each other over one or more communication buses (not shown), signal lines (not shown) and/or a network infrastructure.

RF-based wireless communication; optical-based wireless communication such as infrared (IR) based signaling, and/or wired communication. The network may be configured for using one or more communication formats, protocols and/or technologies such as, for example, to internet communication, optical or RF communication, telephony-based communication technologies and/or the like. In some examples, communication module 1700 may include I/O device drivers (not shown) and network interface drivers (not shown) for enabling the transmission and/or reception of data over the network. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G, 5G, 6G mobile networks, 3GPP, LTE, LTE advanced, Bluetooth® (e.g., Bluetooth smart), ZigBee™, near-field communication (NFC) and/or any other current or future communication network, standard, and/or system.

Human monitoring activity system 1000 may further include a power module 1800 for powering the various components and/or modules and/or subsystems of the system. Power module 1800 may comprise an internal power supply (e.g., a rechargeable battery) and/or an interface for allowing connection to an external power supply.

It will be appreciated that separate hardware components such as processors and/or memories may be allocated to each component and/or module of human activity system 1000. However, for simplicity and without be construed in a limiting manner, the description and claims may refer to a single module and/or component. For example, although processor 1300 may be implemented by several processors, the following description will refer to processor 1300 as the component that conducts all the necessary processing functions of human activity monitoring system 1000.

Functionalities of human activity monitoring system 1000 may be implemented fully or partially by a multifunction mobile communication device also known as "smartphone", a mobile or portable device, a non-mobile or non-portable device, a digital video camera, a personal computer, a laptop computer, a tablet computer, smart watch, a server (which may relate to one or more servers or storage systems and/or services associated with a business or corporate entity, including for example, a file hosting service, cloud storage service, online file storage provider, peer-to-peer file storage or hosting service and/or a cyberlocker), personal digital assistant, a workstation, a wearable device, a handheld computer, a notebook computer, a vehicular device, a non-vehicular device, a stationary device and/or a home appliances control system. For example, ultrasound transducer 1100 and sensor 1200 may be comprised in a smartphone camera, and some of activity monitoring engine 1500 functionalities may be implemented by the smartphone and some by devices and/or system external to the smartphone. Alternative configurations may also be conceived.

Figure 2:
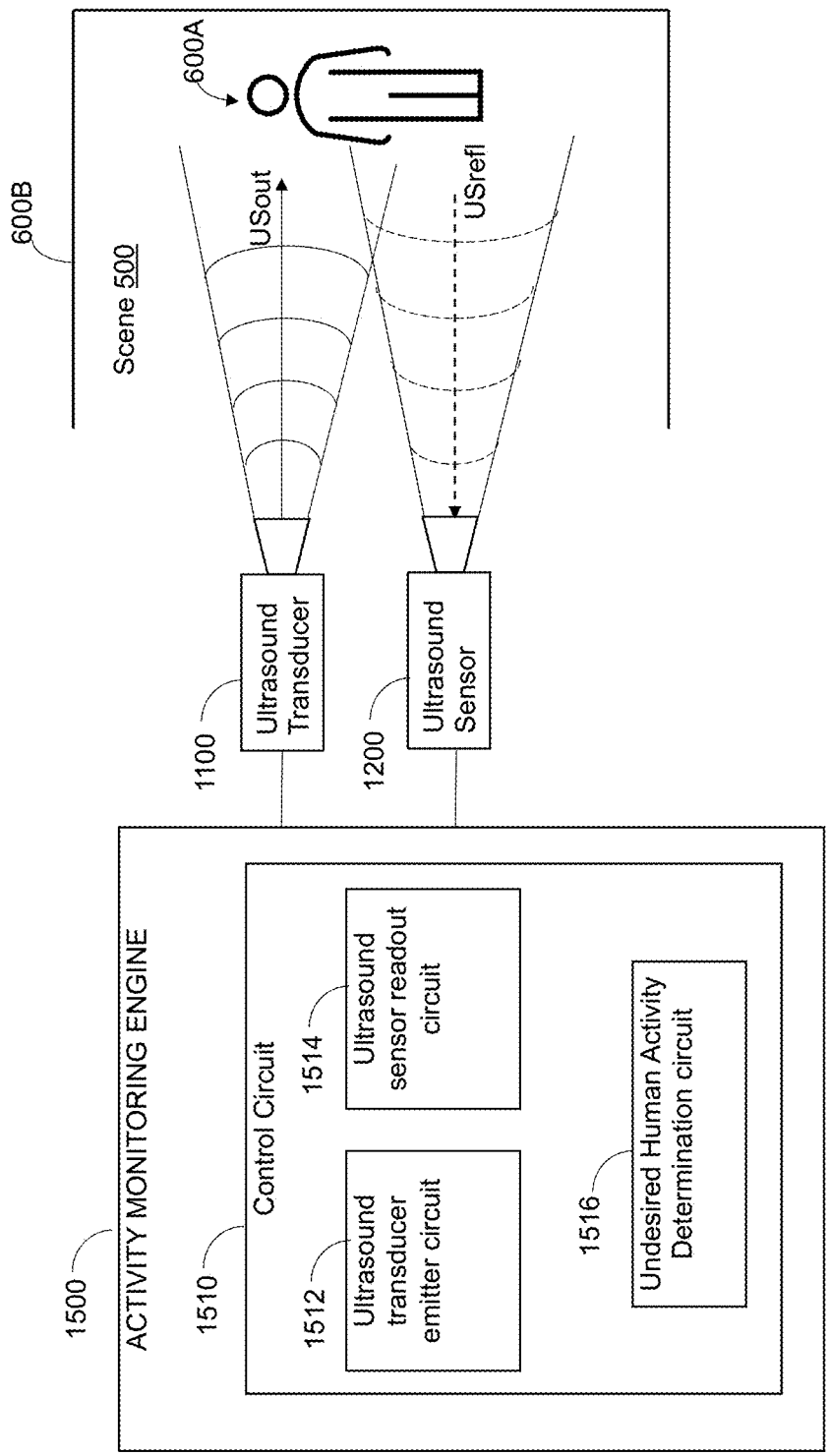
FIG. 2 is a schematic illustration of a human activity monitoring engine, according to some embodiments.

Additional reference is now made to FIG. 2. In some embodiments, processor 1300 and memory 1400 implementing functionalities of activity monitoring engine 1500 may be configured as control 1510 comprising an ultrasound transducer emitter circuit 1512 configured to control ultrasound transducer 1100, an ultrasound sensor readout circuit 1514 configured to control the readout of ultrasound sensor 1200, and an undesired human activity determination circuit 1516 configured to detect and issue and alert about undesired human activity by human 600A in scene 500.

Figure 3B:
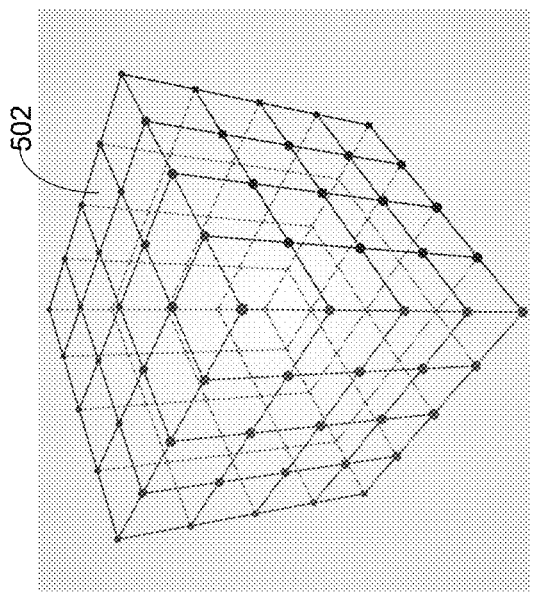
FIG. 3A-B are schematic illustrations of resolution coverage provided by the system, according to some embodiments.
Figure 3A:
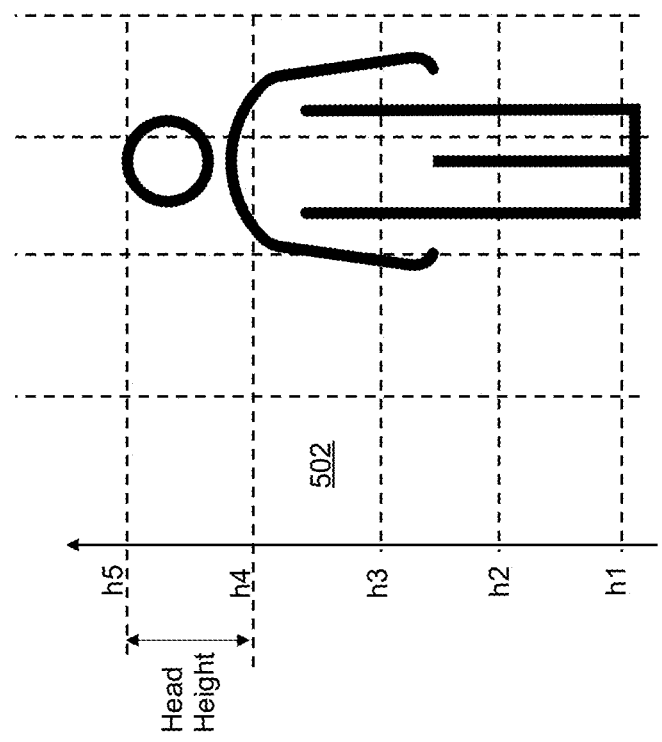

Additional reference is made to FIGS. 3A-B and further to FIGS. 4A-D. As briefly mentioned herein, a plurality of sets of ultrasound transducers 1100 and sensors 1200 may be arranged to provide coverage of a corresponding plurality of scene portions, for example, to determine limb and/or torso position of human 600A within scene 500. In the example shown, scene 500 is a fully or partially confined space such as, for example, a bathroom, lavatory, prison cell, playground, children's room, and/or the like. Accordingly, the employment of ultrasonic-based techniques allows monitoring of human activity in humid and wet scene environments (e.g., showers), without compromising the persons privacy. For instance, facial features may not be identifiable. In addition, monitoring human activity in scene 500 is possible even under adverse visibility conditions. For example, human activity may be monitored even when scene 500 is completely dark, fogged, etc.

As is shown in FIGS. 3A and 3B, first ultrasound transducers 1100 and first sensors 1200 are arranged to provide coverage of at least a part or the entire height, width and depth of scene 500.

In the discussion that follows, the expression "providing scene coverage", as well as grammatical variations thereof, refers to arranging ultrasound transducers and sensors to obtain ultrasound rejections from scene 500 allowing the monitoring of human activity in the scene through monitoring the position and orientation of anatomical parts. In the discussion that follows, the expression "anatomical parts" may pertain to extremities or limbs (arms, legs), the torso and head of a human. The position and orientation may pertain to the human posture, as well as to the location of the anatomical parts in scene.

In some embodiments, second ultrasound transducers 1102 and/or sensor 1202 may be arranged to allow partial or full coverage of scene 500. In some embodiments, first and second ultrasound transducers and sensors may be arranged in a matrix, e.g., in a row extending from bottom to top of scene 500).

As is shown in FIG. 3B, the plurality of ultrasound transducers 1100 and sensors 1200 are arranged to allow characterizing a plurality of virtual volumetric (e.g., cube) portions defining scene 500 or defining an ROI of scene 500. For example, the virtual volumetric portions 502 may defined as being "occupied" or "free", along with a corresponding time stamp. In some examples, the virtual volumetric portions may be referred to as "large" voxels which are constructed by monitoring system 1000 to represent corresponding portions of scene 500.

A virtual volumetric portion 502 may be considered "occupied" if an occupation criterion is met, and a human body portions is located therein, and considered "free" if the occupation criterion is not met. For example, an occupation criterion for a virtual volumetry portion is met when a human body portion (e.g., limb, torso, head, etc.) is occupied thereby, fully or partially. A large voxel or virtual volumetric portion 502 may be occupied by different portions or the same anatomical part.

For example, three voxels may be considered being "occupied" by the head and two voxels may be considered or defined as being occupied by an arm. In some examples, an occupation criterion for a virtual volumetry portion is met when at least 30% of the virtual volumetric portion is occupied by about 30% of the length or height dimension of one of the above noted human body portions.

In some embodiments, the voxel resolution is comparatively low and may, for example, not exceed half the dimension of a person's limb, the head or torso. In some examples, the reflection-based data may provide a resolution of not less (or not better) than 5%, 10%, 15%, 20%, 25%, 30%, 35%, or 40%, coverage of a desired height and/or width range.

It is noted that anatomical dimensions and proportions may differ among various population groups (e.g., adults, children, male, female, race, etc.). To account for the different anatomical dimensions and/or proportions among different population groups, system 1000 may be configured to adaptively adjust voxel occupation criterion and/or voxel size, to accommodate for the monitoring of different population groups.

In some embodiments, the user may configure monitoring system 1000 by specifying anatomical information about the person to be monitored and/or by specifying to which population group the person to be monitored belongs.

In some embodiments, monitoring system 1000 may be configured to automatically adapt the occupation criterion and/or voxel size, to accommodate for the monitoring of persons belonging to different population groups. For example, monitoring system 1000 may be configured to automatically detect, for example, through sampling, various anatomical dimensions of the person's anatomical parts.

System 1000 may be configured such that the lower limit of spatial voxel coverage is defined to provide, for example, a resolution of median or average limb length, median or average head or torso height, or half of the median or average limb length or head or torso height, and/or the like.

In some embodiments, body proportions may be considered as well, for example, for validation purposes. For example, detection of disproportionate body portions by system 1000 may provide an indication that the system requires reconfiguration. On the other hand, when body proportions are considered within a statistically acceptable range (standard deviation), then monitoring can be commenced or continued.

System validation may be performed once prior to starting to monitor the activity of a human. Optionally, system validation may be performed periodically after monitoring has commenced.

In some embodiments, system 1000 may be configured to allow or enable semi-automatic or fully automatic calibration to accommodate for the monitoring of persons with different anatomical size parts and/or proportions. In some embodiments, calibration may be performed by applying a plurality of samples of the person to be monitored to generate data descriptive of size of the person's anatomical parts. Optionally, the sampling may be supervised and controlled by the user. In some embodiments, the calibration procedure may be performed without knowledge of the person to be monitored.

Figure 4C:
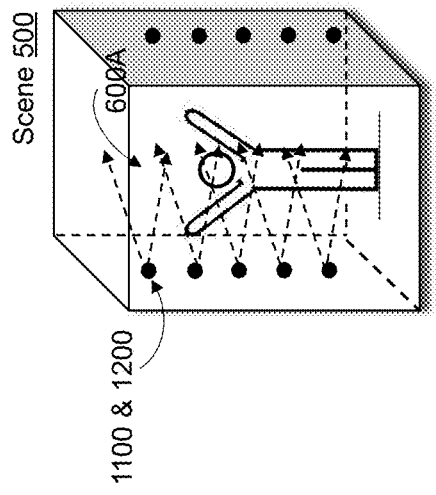
FIGS. 4A-D are schematic illustrations of identifiable human postures in a scene, according to some embodiments.
Figure 4D:
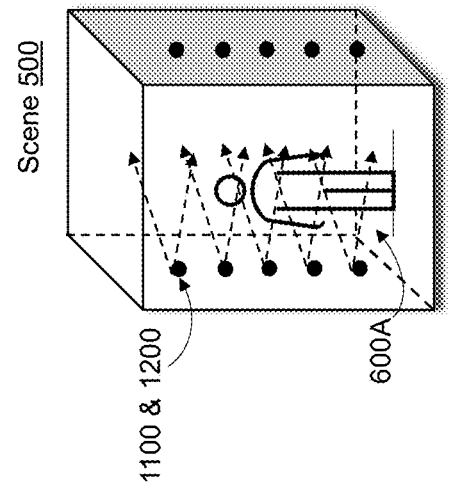
Figure 4A:
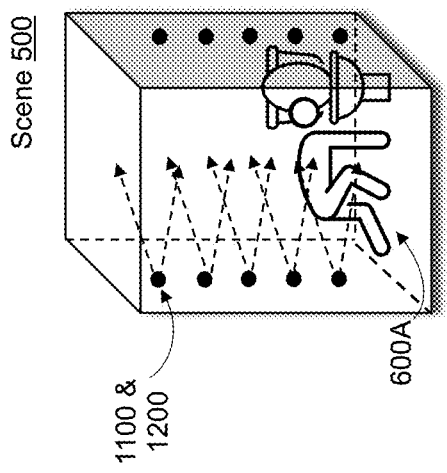

FIG. 4A schematically shows a kneeing/bent over posture that may be identified and characterized (e.g., classified) as an activity relating to an undesired event, eventually indicating that the person is vomiting.

Figure 4B:
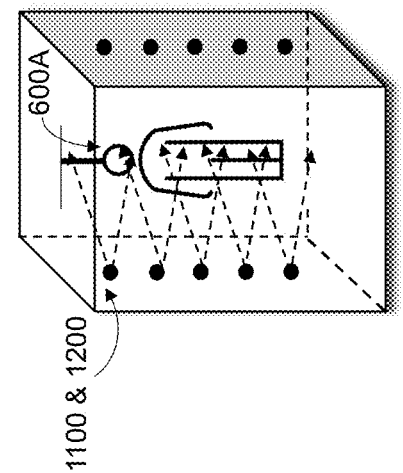

FIGS. 4B and 4C schematically shows additional human postures that may be identified and characterized relating to activities that may pertain to an undesired event. For example, FIG. 4B schematically shows person 600A holding up both hands up in the air for a certain time period. The activity shown in FIG. 4B may provide an indication that the person is trying to commit suicide through hanging by tying knots above his head; by detecting when both feet of the human are above ground simultaneously for a certain time period, or the like.

FIG. 4C shows a scenario where the person's feet do not touch the floor (or any other reference surface) of the monitored space, providing an indication that person 600A in the process of committing suicide through hanging.

FIG. 4D schematically shows person 600A normally standing within scene 500, not providing indication about an undesired event.

In some embodiments, scene 500 may be virtually divided into a plurality of scene regions to allow characterizing human postures according to the person's location in scene 500. For example, a certain human posture may be associated with an undesired event in a first location, but not as such in a second location. For example, a person undressing may momentarily hold up both hands in a locker room or changing area. The activity of holding up both hands in a locker room or changing area may therefore not be associated with an undesired event. On the other hand, the activity of holding up both hands in a shower stall may be associated with an undesired event.

In some embodiments, system 1000 may comprise one or more microphones for performing acoustic monitoring of scene 500 and/or for tracking movement. Acoustic monitoring may for instance include the monitoring of breathing sounds, steps, of running showering water, and/or the like. In some examples, silence, a sensed acoustic level below a certain threshold, and/or sound that matches certain patterns, may be associated with an undesired event.

In some embodiments, software code may represent expert systems and/or machine learning models. Accordingly, monitoring system 1000 may be configured to implement artificial intelligence functionalities and analysis of reflection-based ultrasonic data may be performed by way of one or more machine learning models or algorithms such as artificial neural networks (ANNs), to identify human postures relating to potentially undesired events.

In some embodiments, the system may be configured to perform signal analysis using heuristics models. Further, in some instances, the machine learning and heuristics models may be combined into a hybrid model for performing signal analysis. In some embodiments, the machine learning model may be trained based on a plurality of analyses previously performed by a professional in the field of human activity monitoring. In some examples, the system may be configured to receive data descriptive of human activity monitoring analysis information which may be used as input training data for the AI-based machine learning model.

Figure 5:
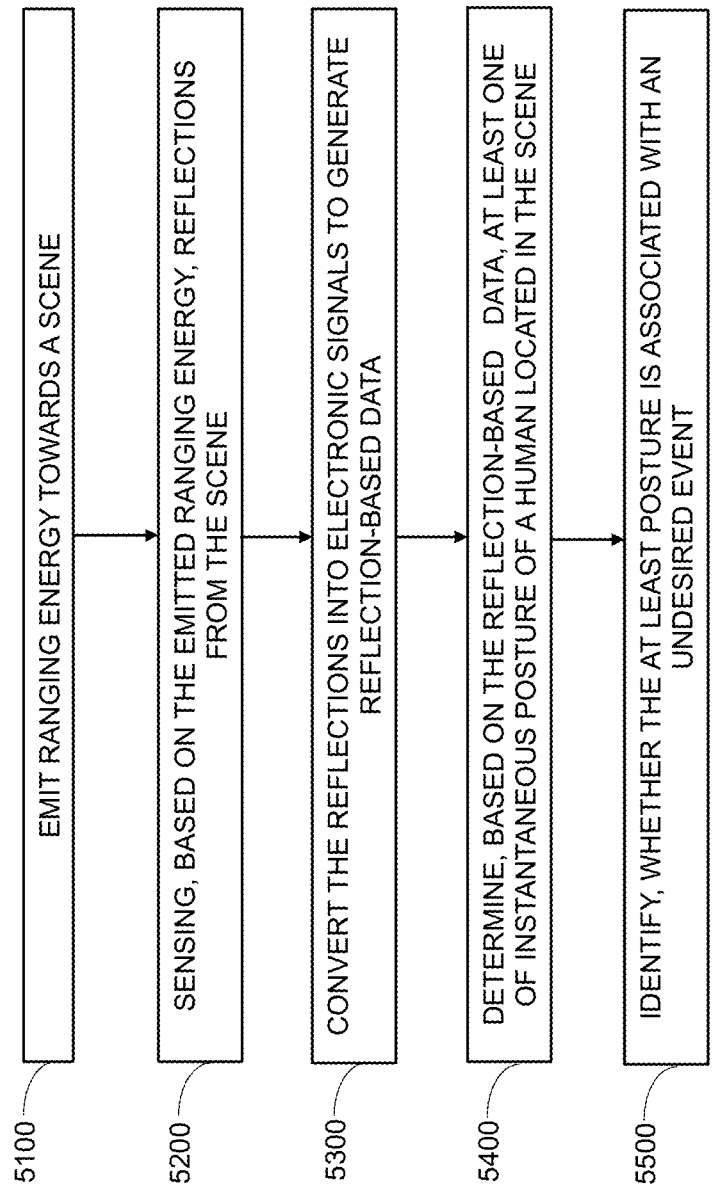
FIG. 5 is a flow chart of a method for monitoring human activity in a scene, according to some embodiments.

Further referring to FIG. 5, a method for monitoring human activity in a scene may comprise emitting ranging energy towards a scene (e.g., remote ranging emitters such as ultrasonic transducers and/or laser light sources) (block 5100).

In some embodiments, the method may further include sensing, based on the emitted ranging energy, reflections from the scene (block 5200).

In some embodiments, the method may further include converting (e.g., by sensors) the reflections into electronic signals to generate reflection-based data (block 5300).

In some embodiment, the method may also include determining, based on the reflection-based data, at least one of instantaneous posture of a human located in the scene (block 5400).

In some embodiments, the method may further include identifying, whether the at least posture is associated with an undesired event (block 5500).

ADDITIONAL EXAMPLES

Example 1 pertains to a non-wearable monitoring system for monitoring activity of a human in a scene, comprising: a plurality of remote ranging emitters which are configured to emit ranging energy towards a scene,
  wherein the plurality of remote ranging emitters is arranged to obtain, based the emitted ranging energy, reflections from the scene,
  wherein direct or indirect yet non-obstructed line-of-sight is required between the scene and both the remote ranging emitters and sensors;
  a plurality of sensors which are configured to receive the reflections from the scene and to convert the reflections into electronic signals to generate reflection-based data;
  at least one processor; and
  at least one memory configured to store data and software code portions executable by the at least one processor for:
  determining, based on the reflection-based data, at least one of instantaneous posture of a human located in the scene; and
  identifying, whether the at least posture is associated with an undesired event.

In Example 2, the subject matter of example 1 may include wherein an undesired event relates to one of the following: self-inflicted injury, self-inflicted death, lying down, kneeing, falling, not moving for a certain period of time, and bending over.

In Example 3, the subject matter of example 1 and/or example 2 may include wherein the system is further to configured to provide an alarm output if the at least one posture is identified as being associated with the undesired event.

In Example 4 the subject matter of any one or more of the examples 1 to 3 may include wherein the plurality of sensors are selected to cover a scene portion such to meet a low visualization criterion to prevent recognizing, by a viewer of human posture visualizations of the reflection-based ultrasound data, one or more instantaneous postures of the human in the scene.

In example 5, the subject matter of any one or more the examples 1 to 4 may include wherein the plurality of remote ranging emitters and the plurality of sensors are concealed from the human located in the scene.

In example 6 the subject matter of any one or more of the examples 1 to 5 may include wherein the plurality of remote ranging emitters and/or sensors are partially embedded objects in the scene.

In example 7 the subject matter of any one or more of the examples 1 to 6 may include wherein the scene is one of a shower, a restroom, a bathroom, a prison cell, hospital room, elderly home, bedroom, any of the above.

In example 8 the subject matter of any one or more of the examples 1 to 8 may include, wherein the plurality of sensors are arranged to receive reflections to obtain a resolution of reflection-based data of not less than 5%, 10%, 15%, 20%, 25%, 30%, 35%, or 40% coverage of a desired height and/or width range.

In example 9 the subject matter of any of the examples 1 to 8 may include wherein the emitters are ultrasound transducers and the sensors are configured to operably sense ultrasound energy reflected from the scene.

In example 10, the subject matter of any one or more of the examples 1 to 9 may include wherein the emitters emit laser light and the sensors are configured to operably sense laser light reflected from the scene.

Example 11 pertains to a method for monitoring activity of a human in a scene, comprising:
  emitting ranging energy by remote ranging emitters towards a scene comprising an object-of-interest (OOI);
  responsively receiving reflections from the scene by sensors;
  wherein direct or indirect yet non-obstructed line-of-sight is required between the scene and both the remote ranging emitters and sensors;
  determining, based on the received reflection, at least one of instantaneous posture of a human located in the scene; and
  identifying, whether the at least posture is associated with an undesired event.

In Example 12 the subject matter of example 11 may optionally include, wherein an undesired event relates to one of the following:
  self-inflicted injury, not-moving for a certain time period, self-inflicted death, lying down, kneeing, falling, and bending over.

In Example 13, the subject matter of example 11 and/or example 12 may further comprise providing an alarm output if the at least one posture is identified as being associated with the undesired event.

In Example 14, the subject matter of any one or more of the examples 11 to 13 may include arranging the plurality of sensors to cover a scene portion such to meet a low visualization criterion to prevent recognizing, by a viewer of human posture visualizations of the reflection-based ultrasound data, one or more instantaneous postures of the human in the scene.

In Example 15, the subject matter of any one or more of the examples 11 to 13 may comprise concealing the plurality of remote ranging emitters and the plurality of sensors from the human located in the scene.

In Example 16, the subject matter of any one or more of the Examples 11 to 15 may include wherein the scene is one of a shower, a restroom, a bathroom, a prison cell, hospital room, elderly home, bedroom, any of the above.

In Example 17, the subject matter of any one or more of the Examples 11 to 16 may include arranging the plurality of sensors to receive reflections to obtain a resolution of reflection-based data of not less than 5%, 10%, 15%, 20%, 25%, 30%, 35%, or 40% coverage of a desired height and/or width range.

In Example 18, the subject matter of any one or more of the Examples 11 to 17 may include emitting one of the following ranging energies: ultrasound energy, emitting laser energy; emitting infrared electromagnetic energy, or any combination of the aforesaid.

Example 19 pertains to a non-wearable monitoring system for non-intrusively monitoring activity of a human in a scene including a floor, comprising:
  a plurality of remote ranging emitters which are configured to emit ranging energy towards the scene from at least one first direction and from at least one second direction, different from the first direction,
  wherein the plurality of remote ranging emitters is arranged to obtain, based on the emitted ranging energy, reflections, from the subject,
  a plurality of sensors which are configured to receive the reflections reflected from the subject and to convert the reflections into electronic signals to generate reflection-based data;
  at least one processor; and
  at least one memory configured to store data and software code portions executable by the at least one processor for:
  determining, based on the reflection-based data, whether both feet are simultaneously above the floor to detect attempts of committing suicide by the human through hanging.

In some examples, the at least two emitters and sensors are arranged such that there is no dead space when imaging the space of a room.

In some examples at least one first and at least one second emitter of the plurality of emitters are arranged to cover different height sections of the scene.

In some examples, an undesired event relates to one of the following: self-inflicted injury, self-inflicted death, lying down, kneeing, falling, non-moving, and bending over.

In some examples, the system is configured to provide an alarm output if or when the at least one posture is identified as being associated with the undesired event.

In some examples, the emitted ranging energy and/or the plurality of sensors are configured and/or selected to cover a scene portion such to meet a low visualization criterion to prevent recognizing, by a viewer of human posture visualizations of the reflection-based ultrasound data, one or more instantaneous postures of the human in the scene.

In some examples, the plurality of remote ranging emitters and the plurality of sensors are concealed from the human located in the scene.

In some examples, the plurality of remote ranging emitters and/or sensors are partially embedded objects in the scene.

In some examples, the scene includes any one of the following: a confined space such as a shower; a restroom; a bathroom; a prison cell; a hospital room; an elderly home; a hotel room, and/or a bedroom.

In some examples, the plurality of sensors are arranged to receive reflections to obtain a resolution of reflection-based data of not less than 5%, 10%, 15%, 20%, 25%, 30%, 35%, or 40% coverage of a desired height and/or width range.

In some examples, the emitters are ultrasound transducers, and the sensors are configured to operably sense ultrasound energy reflected from the scene.

In some examples, the emitters emit laser light, and the sensors are configured to operably sense laser light reflected from the scene.

In some examples, a method for monitoring activity of a human in a scene including a floor, comprises:
  emitting, by at least one first and at least one second emitter of the plurality of emitters ranging energy towards a scene comprising an object-of-interest (OOI)

from a first direction and from a second direction that is different from the first direction;

receiving, at sensors, reflections from the scene to generate sensor ranging data;

determining, based on the sensor ranging data, whether both feet of the human are simultaneously above the floor to detect attempts of committing suicide by the human through hanging.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The expression "real-time" as used herein generally refers to the updating of information based on received data, at essentially the same rate as the data is received, for instance, without user-noticeable judder, latency or lag.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A,B,C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that ultrasonic and/or audio data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A non-wearable monitoring system for non-intrusively monitoring activity of a human in a scene including a floor, comprising:
    a plurality of remote ranging emitters which are configured to emit ranging energy towards the scene from at least one first direction and from at least one second direction, different from the first direction,
    wherein the plurality of remote ranging emitters is arranged to obtain, based on the emitted ranging energy, reflections, from the human,
    a plurality of sensors which are configured to receive the reflections reflected from the human and to convert the reflections into electronic signals to generate reflection-based data;

at least one processor; and at least one memory configured to store data and software code portions executable by the at least one processor for:

determining, based on the reflection-based data, whether both feet are simultaneously above the floor to detect attempts of committing suicide by the human through hanging.

2. The non-wearable monitoring system of claim 1, wherein the at least two emitters and sensors are arranged such that there is no dead space when imaging the space of a room.

3. The non-wearable monitoring system of claim 1, wherein at least one first and at least one second emitter of the plurality of emitters are arranged to cover different height sections of the scene.

4. The non-wearable monitoring system of claim 1, wherein an undesired event relates to one of the following:

self-inflicted injury, self-inflicted death, lying down, kneeing, falling, non-moving, and bending over.

5. The non-wearable monitoring system of claim 1, further configured to provide an alarm output if the at least one posture is identified as being associated with the undesired event.

6. The non-wearable monitoring system of claim 1, wherein the plurality of sensors are selected to cover a scene portion such to meet a low resolution criterion to prevent recognizing, by a viewer of human posture visualizations of the reflection-based ultrasound data, one or more instantaneous postures of the human in the scene.

7. The non-wearable monitoring system of claim 1, wherein the plurality of remote ranging emitters and the plurality of sensors are concealed from the human located in the scene.

8. The non-wearable monitoring system of claim 1, wherein the plurality of remote ranging emitters and/or sensors are partially embedded objects in the scene.

9. The non-wearable monitoring system of claim 1, wherein the scene includes any one of the following: a shower; a restroom; a bathroom; a prison cell; a hospital room; an elderly home; a bedroom.

10. The non-wearable monitoring system of claim 1, wherein the plurality of sensors are arranged to receive reflections to obtain a resolution of reflection-based data of not less than 5%, 10%, 15%, 20%, 25%, 30%, 35%, or 40% coverage of a desired height and/or width range.

11. The non-wearable monitoring system of claim 1, wherein the emitters are ultrasound transducers, and the sensors are configured to operably sense ultrasound energy reflected from the scene.

12. The non-wearable monitoring system of claim 1, wherein the emitters emit laser light, and the sensors are configured to operably sense laser light reflected from the scene.

13. The non-wearable monitoring system of claim 1, wherein the system is configured to generate reflection-based data preventing the recognition and/or identification of the human being monitored.

14. The non-wearable monitoring system of claim 1, wherein the system is configured to determine a subject's posture without providing information about the subject's body contour.

15. The non-wearable monitoring system of claim 1, wherein the system generated reflection-based data is configured to prevent identification and recognition by employing one of the following, separately or in any combination:

ensuring monitoring data meets a low-resolution criterion by not exceeding a low-resolution threshold; and applying a filter to lower the resolution image data prior to analyzing the image data with respect to undesired activities.

16. A method for monitoring activity of a human in a scene including a floor, the method comprising:

emitting, by at least one first and at least one second emitter of the plurality of emitters ranging energy towards a scene comprising an object-of-interest (OOI) from a first direction and from a second direction that is different from the first direction;

receiving, at sensors, reflections from the scene to generate sensor ranging data;

determining, based on the sensor ranging data, whether both feet of the human are simultaneously above the floor to detect attempts of committing suicide by the human through hanging.

17. The method of claim 16, wherein direct or indirect yet non-obstructed line-of-sight is required between the scene and both the remote ranging emitters and sensors.

18. The method of claim 16, arranging the plurality of sensors to cover a scene portion such to meet a low visualization criterion to prevent recognizing, by a viewer of human posture visualizations of the reflection-based ultrasound data, one or more instantaneous postures of the human in the scene.

19. The method of any one of claim 16, comprising:

concealing the plurality of remote ranging emitters and the plurality of sensors from the human located in the scene.

20. The non-wearable monitoring method of claim 16, wherein emitting ranging energy towards the scene comprises one of the following:

emitting ultrasound energy, emitting laser energy; emitting infrared electromagnetic energy, or any combination of the aforesaid.

* * * * *